United States Patent
Gu

(10) Patent No.: US 8,558,865 B2
(45) Date of Patent: Oct. 15, 2013

(54) TRANSMISSION METHOD IN COMMUNICATION OF VIDEO PHONE

(75) Inventor: Xiaofeng Gu, Shenzhen (CN)

(73) Assignee: ZTE Corporation, Guangdong (CN)

( * ) Notice: Subject to any disclaimer, the term of this patent is extended or adjusted under 35 U.S.C. 154(b) by 313 days.

(21) Appl. No.: 13/119,768

(22) PCT Filed: Sep. 30, 2009

(86) PCT No.: PCT/CN2009/074348
§ 371 (c)(1),
(2), (4) Date: Mar. 18, 2011

(87) PCT Pub. No.: WO2010/040320
PCT Pub. Date: Apr. 15, 2010

(65) Prior Publication Data
US 2011/0169909 A1  Jul. 14, 2011

(30) Foreign Application Priority Data

Oct. 6, 2008 (CN) .......................... 2008 1 0169513

(51) Int. Cl.
*H04N 7/14* (2006.01)
*H04M 11/00* (2006.01)

(52) U.S. Cl.
USPC .................. 348/14.01; 348/14.02; 348/14.03; 379/88.13; 379/88.14

(58) Field of Classification Search
USPC ................... 348/14.01, 14.03, 14.07, 14.12; 379/88.13, 88.14
See application file for complete search history.

(56) References Cited

U.S. PATENT DOCUMENTS

| 8,081,205 B2 * | 12/2011 | Baird et al. | 348/14.08 |
| 8,125,507 B2 * | 2/2012 | Ryu et al. | 348/14.02 |
| 2002/0057774 A1 * | 5/2002 | Kim et al. | 379/100.01 |
| 2004/0203610 A1 * | 10/2004 | Deeds | 455/412.1 |
| 2005/0105710 A1 * | 5/2005 | Trinkel et al. | 379/221.03 |
| 2006/0029197 A1 * | 2/2006 | Pham | 379/88.22 |
| 2006/0092269 A1 * | 5/2006 | Baird et al. | 348/14.08 |

(Continued)

FOREIGN PATENT DOCUMENTS

| CN | 101175264 A | 5/2008 | |
| CN | 101384008 A | 3/2009 | |
| KR | 20070119306 A | 12/2007 | |
| WO | WO 2009/031720 A1 * | 3/2009 | H04Q 7/38 |

OTHER PUBLICATIONS

International Search Report in international application No. PCT/CN2009/074348, mailed on Jan. 7, 2010.

(Continued)

*Primary Examiner* — Khai N Nguyen
(74) *Attorney, Agent, or Firm* — Carter, DeLuca, Farrell & Schmidt, LLP

(57) ABSTRACT

The present invention discloses a transmission method in communication of a video phone, which utilize a user input indication messages to include a text message during communication of telephone call, and displays the text message on the calling interface of the terminal, thereby providing transmission of text messages during communication of the video phone. The present invention has improved message interaction between the mobile phones and is suitable for sending and receiving a text message during a telephone call of video mobile phones in the 3G network. The user can directly input words on the calling interface and send them to the other party, and the inputted text message can be directly displayed on the user's calling interface after choosing to send the text message.

13 Claims, 4 Drawing Sheets

(56) References Cited

U.S. PATENT DOCUMENTS

| | | | |
|---|---|---|---|
| 2007/0070182 A1* | 3/2007 | Ryu et al. | 348/14.02 |
| 2007/0291107 A1 | 12/2007 | Kang | |
| 2008/0094467 A1* | 4/2008 | An et al. | 348/14.02 |
| 2010/0087180 A1* | 4/2010 | Wilson | 455/418 |
| 2010/0208030 A1* | 8/2010 | Kim et al. | 348/14.02 |

OTHER PUBLICATIONS

English Translation of the Written Opinion of the International Search Authority in international application No. PCT/CN2009/074348, mailed on Jan. 7, 2010.

* cited by examiner

TRANSMISSION METHOD IN COMMUNICATION OF VIDEO PHONE

TECHNICAL FIELD

The present invention relates to the technical field of 3G mobile phones, specifically to a transmission method in communication of a video phone.

BACKGROUND

During a telephone call, when it is necessary to remember the other party's useful message, including memorizing important message such as an address, a user would oftentimes have to find a tool like a pen and a piece of paper to take a record, and this is generally quite troublesome. Also, if the other party's accent is inaccurate or when the environment is so noisy that the user could hardly hear clearly what the other party is talking about, the user would oftentimes have to work very hard before he/she can understand the meaning of the other party's conversation.

Of course, during a telephone conversation, the user can access a short message module, find the address of the other party of the telephone call, and then send a short message, while the other party can, after receiving the short message during the telephone call, access a short message module to check the short message; however, such operation oftentimes not only is inconvenient but also will generate extra costs, thereby resulting in a reduction in the actual operation efficiency.

SUMMARY

The technical problem that the present invention intends to resolve is providing a transmission method in communication of a video phone so that a user can directly input words on a calling interface and send them to the other party of the call, and the text message will be received and directly displayed on the calling interface of the other party.

In order to solve the above-mentioned problem, the present invention provides a method for transmitting a text message in communication of a video phone, which includes:

utilizing a user input indication message to include a text message during a telephone call, and displaying text contents of the text message on a calling interface of a terminal;

realizing transmission of the text message in communication of a video phone.

Furthermore, before the step of utilizing a user input indication message to include a text message, the transmission method may also include:

editing the text contents of the text message on the calling interface of the user terminal.

Furthermore, after completing editing the text contents of the text message, the step of utilizing a user input indication message to include a text message may include:

adding a message header to the text message; and sending the text message to the other party of the call through the user input indication message;

wherein the message header is used for marking the text message containing text contents that is included in the user input indication message.

Furthermore, in the step of displaying text contents of the text message on a calling interface of a terminal, the other party of the call may receive the user input indication message including the text message, and display the text contents of the text message on the calling interface of his/her own terminal.

Furthermore, the calling interface may be equipped with an operating interface, when the text message is being edited or received, the text message may be displayed on the operating interface.

Furthermore, the operating interface may include a display area and provide operating commands for the user or the other party of the call to operate, and the text message may be displayed in the display area;

the operating commands for the text contents may include: editing a message, deleting a message, sending a message, saving a message or replying a message.

Furthermore, the text message may comprise text contents and a message header, and the message header may be used for marking the text message containing the text contents that is included in the user input indication message. Furthermore, in the step of editing text contents of the text message:

in a video phone call state, when it is necessary to edit text contents and send them to the other party of the call, the user may enter a state of editing the text contents; and, on the calling interface, the user may enter an message editing box to input and edit the text contents.

Furthermore, before the step of sending the text message through the user input indication message, the text message may be saved into the memory of the user terminal to make it easy to send for multiple times.

Furthermore, when the text contents of the text message exceed a set value, the text message may be sent to the other party of the call in batches.

Furthermore, the text message may comprise text contents and a message header, and the message header may be used for marking the text message containing the text contents that is included in the user input indication message;

before the step of sending the text message through the user input indication message, the transmission method may also includes:

the user terminal first performs handshake negotiation with the terminal of the other party of the call, if the negotiation result is that the terminal of the other party of the call can parse the message header, then the user terminal executes the sending step.

Furthermore, the message header may be used for marking the text message containing the text contents that is included in the user input indication message;

after the step that the other party of the call receives the user input indication message including the text message, the transmission method may also include:

the terminal of the other party of the call parses the message header to determine that the text message containing the text contents is included in the user input indication message, and extracts the text contents of the text message received to display them on its own calling interface.

Furthermore, in the step of displaying text contents of the text message on a calling interface of a terminal, upon completion of extracting the text contents, the terminal's operating interface for the text contents of the text message may be accessed;

the text contents of the text message may be displayed on the operating interface of the calling interface, and the text contents may be operated on the operating interface.

Furthermore, the transmission method may also include: judging based on the message header whether the user input indication message is including a command message or a text message, if the user input indication message contains the message header, then the user input indication message includes a text message, therefore the text contents after the message header in the text message can be acquired.

Furthermore, the transmission method may also include:

If the negotiation result is that the terminal of the other party of the call does not support parsing the message header, then the user terminal will send the text contents of the text message via a short message to the other party of the call so that the other party of the call can access his/her terminal's short message module to read the text contents.

The present invention has improved message interaction between mobile phones and is suitable for sending and receiving a text message during a telephone call of video mobile phones in the 3G network. The user can directly input words on the calling interface and send them to the other party, and the inputted text message can be directly displayed on the user's calling interface after the user chooses to send the text message. Offering a very strong real time property, easy operation and free message sending, this method will certainly receive a warm welcome from users.

The method of the present invention can, for those terminals that can be used to directly display text contents of a text message during a telephone call of video mobile phones, utilize a user input indication message to include the text message; and for those terminals that can not directly display text contents of a text message during a telephone call of video mobile phones, the text contents of the text message that the sending terminal has directly edited during the telephone call can be sent by means of a short message through the background in this method, and the receiving terminal receives the text contents via a short message. The present invention has given full consideration to the compatibility among different terminals, thus expanding the range of application of the method of the present invention.

DETAILED DESCRIPTION

In the present invention, the sending and receiving of a text message are mainly realized by utilizing a user input indication message in the ITU-T H245 multimedia control protocol supported by the video phone protocol stack. In current video phone applications, this feature is mainly used for realizing a dual-tone multi-frequency (DTMF) function on class voice phones, i.e. every time the user inputs a character on a mobile phone's keyboard, such as a number, "*" or "#", the H245 will send these characters to the terminal of the other party of the call. At the same time, the user input indication message is also used for providing a message indication between terminals, for example, one party's terminal can send a particular character string to the other party, notifying the other party that the sending terminal is performing video recording, photo shooting, etc, on the other party, and the other party can perform corresponding processing after parsing.

The present invention realizes the sending and receiving of the text message simply by utilizing the function that the ITU-T H245 user input indication message can send a character string to the other party, and also supports class DTMF functions and the user input text message function. If the user wants to send a text message to the opposite terminal, then he/she first accesses the editing module, selects "Edit message" in the menu, enters the editing box and completes editing the text contents of the text message, and then uses the user input indication message to send the text message; if the user does not send any text message to the opposite terminal, then he/she simply sends a character string to the other party in the form of DTMF.

The specific embodiment of the present invention will be further described below in detail in combination with the drawings.

Figure 1:
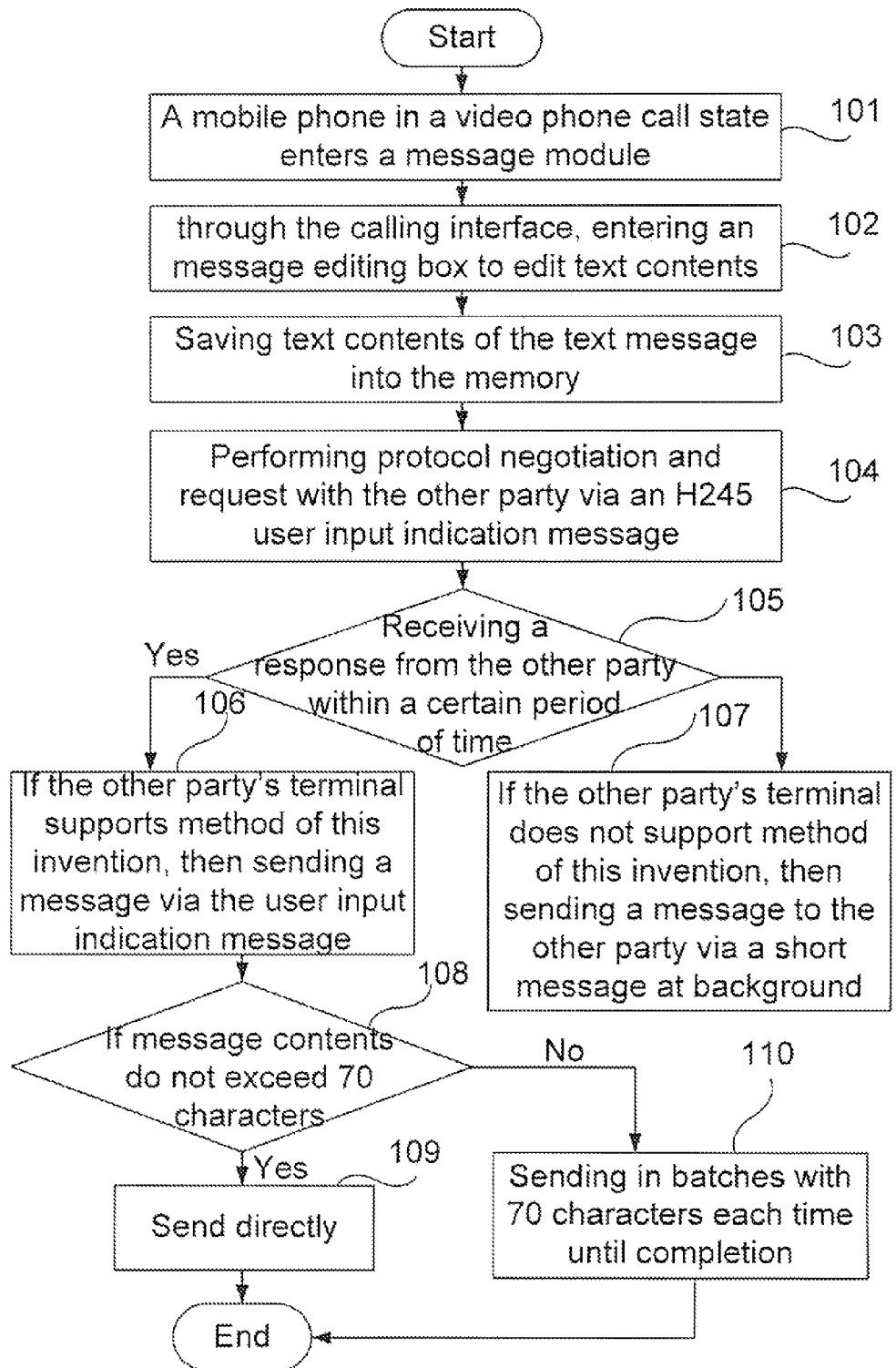
FIG. 1 is a flowchart of sending a text message during a telephone call according to an embodiment of the present invention.

As shown in FIG. 1, which is a flowchart of sending a text message during a telephone call according to embodiments of the present invention, the specific steps of the sending process are as follows.

Step 101: A mobile phone is in a video phone call state, when the user needs to edit text contents of a text message and send them to the other party of the call, the user opens an editing module, and enters a state of editing the text contents of the text message. The editing module is used for providing an operating interface of a calling interface for the text contents of the text message as well as an editing function within the operating interface.

If the user does not choose to edit text contents of a text message but directly presses a key, then the mobile phone will directly send a character string in the form of DTMF.

Step 102: A short message is edited in a message editing box which is accessed through the calling interface, and a sending command is selected upon completion of inputting words.

Step 103: Before sending the text message, the text contents of the text message are first saved into the mobile phone's memory to make it easy to send for multiple times.

Steps 104~107: Before the sending terminal gets ready to use an H245 user input indication message to send the text message, it is necessary to judge whether or not the opposite terminal supports the method of using a user input indication message to include a text message as described in the present invention, if it does not support this method, then the H245 user input indication message can not be used to send the text message, at which moment the opposite terminal can not successfully parse the message header of the text message and can not successfully acquire the text message, therefore, after the user has chosen to send the text message, the sending terminal will not send the text message through the H245 user input indication message, but will send the contents of the text message and the other party's telephone number to its own short message module, and the short message module will send the text message at the background. If the opposite terminal can parse the message header, then the sending terminal directly uses the user input indication message to send the text message, see step 106.

In order to effectively judge whether or not the opposite terminal supports message header parsing, the sending terminal will, before sending the text message, first use the H245 user input indication message to send a protocol request: "INFO_REQUEST" and activate a timer at the same time, if it does not receive an "INTO_PARASE_OK" response from the other party within a certain period of time, then it means that the other party does not support message header parsing, the sending terminal therefore will send the text message and the telephone number to the its own short message module, and the short message module will at the background send them to the other party, see step 107.

Step 108: The text contents of the text message are judged whether nor not they exceed 70 words, if yes, then step 106 will be executed, if not, then step 105 will be executed.

Step 109: If the text contents of the text message edited do not exceed 70 words, then these words will be transmitted into a H245 message indication character string, and then the H245 user input indication message function will be used to send the text message to the other party of the mobile phone call.

Step 110: If the text contents of the text message edited exceed 70 words, then the H245 user input indication message will be used to send the text message in batches to the other party of the mobile phone call, and 70 words will be sent each time until completion.

In order to avoid any loss of the text message being sent, this embodiment specifies that the contents being sent each time shall not exceed 70 words, and such set value can be revisable based on actual situations.

Furthermore, in order to distinguish between a text message and a command message sent by the user, a message header starting with "user_info+" is generally added automatically before the text message sent by the user.

Figure 2:
FIG. 2 is an illustration of an operating interface for sending a text message during a telephone call according to an embodiment of the present invention.

As shown in FIG. 2, which is an illustration of an operating interface for sending text contents of a text message during a telephone call according to embodiments of the present invention, the operating interface comprises an editing area and operating commands, the editing area is used for editing a text message, and the operating commands include: editing a message, deleting a message and sending a message.

It can be seen from the above figure that during a telephone call, it is very easy for the user to send a text message to the other party if the user wants, as long as the user chooses to edit a message, the editing box will be displayed immediately in which the user can edit contents, at the same time some input methods will appear that support characters inputting such as Chinese, English, etc. Once the user chooses to send the message, then the message will be sent immediately.

Figure 3:
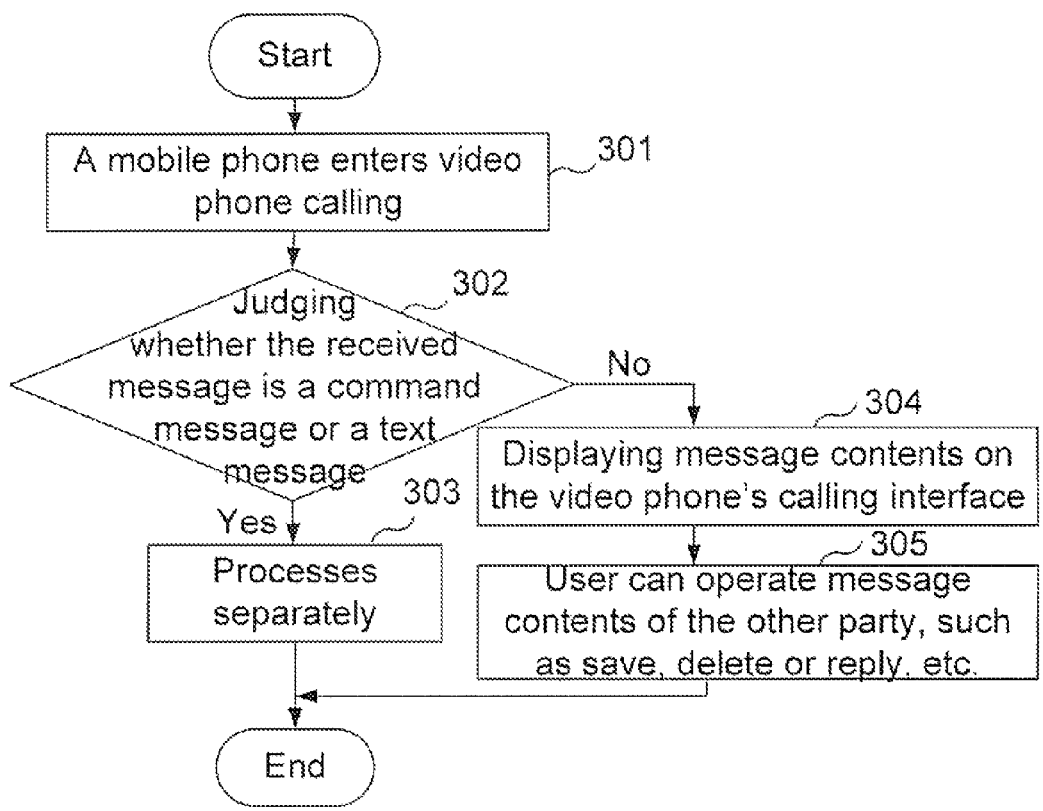
FIG. 3 is a flowchart of receiving a text message through a user input indication message during a telephone call according to an embodiment of the present invention.

As shown in FIG. 3, which is a flowchart of receiving a text message through an H245 user input indication message during a telephone call according to embodiments of the present invention, the process that the receiving terminal receives a text message during a telephone call includes the following steps.

Step 301: the mobile phone enters a video phone communication state.

Step 302: after receiving the user input indication message sent by the other party, the mobile phone first judges whether the user input indication message is a command message or a text message, if it is a text message, then Step 304 will be executed, if it is a command message, then step 303 will be executed.

in this embodiment, the judgment about whether the H245 message is a particular indication message of the video phone or a common text message is made through the message header "user_info+"; the user input indication message will be parsed to see if it contains the message header "user_info+", if yes, then the text contents after the "user_info+" will be acquired and saved.

Step 303: if a particular H245 indication message is received, such as a character string "CC", then the mobile phone determines that multimedia color ring back tone of the video phone starts, and will process it separately.

Step 304: if the H245 message is a text message, then the editing module is opened, the operating interface for the text contents of the text message is accessed, then the text contents of the text message after the "user_info+" that are acquired in step 302 will sent to the editing module, and the message contents will be displayed on the call interface of the video phone and the text contents of the text message will be displayed in the display area of the operating interface;

Step 305: the user can operate, such as save, the text contents of the text message on the operating interface; after saving, the user can check the text message during or after the telephone call; all messages of each telephone call is saved into a same file to make it easier for the user to check.

Figure 4:
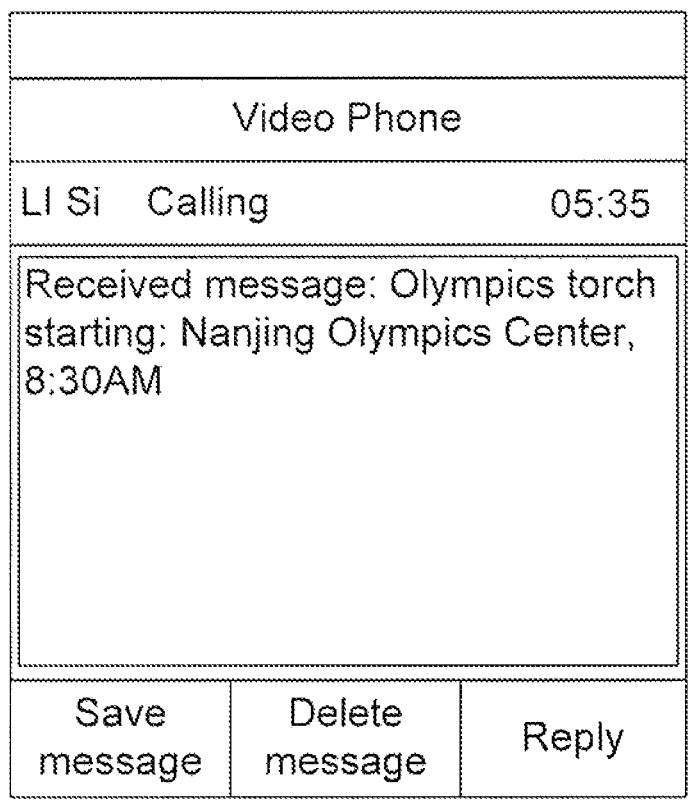
FIG. 4 is an illustration of an operating interface for receiving a text message during a telephone call according to an embodiment of the present invention.

As shown in FIG. 4, which is an illustration of an operating interface for receiving text contents of a text message during a telephone call according to embodiments of the present invention, the operating interface comprises a display area and operating commands, the display area is used for displaying the text contents of the text message, and the operating commands include saving, deleting and replying a message.

The present invention realizes text message input and sending on a call interface of a video phone through an ITU-T H245 user input message supported by the video phone protocol stack, and displays the message on the call interface immediately once the message is received by the other party of the call. This invention offers a very strong real time property, can save messages and reply to the other party, and is convenient to operate and easy to implement. At the same time, consideration is given to the circumstance that the receiving terminal does not support the method of using a user input indication message to include a text message as mentioned in the present invention, based on the consideration the sending terminal will changes to send a short message which is used more generally, thereby enhancing the compatibility with those terminals that do not support the method of the present invention when sending messages.

The contents mentioned above are just the preferred embodiments of the present invention and are in no way intended to restrict the specific implementation methods of the present invention, any and all modifications and changes made based on the primary invention concept of this method shall all fall within the scope of protection as required in the claims attached with the present invention.

INDUSTRIAL APPLICABILITY

The present invention has improved message interaction between mobile phones and is suitable for sending and receiving of a text message during a telephone call of video mobile phones in the 3G network. A user can directly input words on a calling interface and sent them to the other party, and the inputted text message can be directly displayed on the user's calling interface after the user chooses to send the text message. At the same time, consideration is given to the circumstances that the receiving terminal does not support the method of using a user input indication message to include a text message as mentioned in the present invention, based on the consideration the sending terminal changes text message sending into short message sending which is used more generally, thereby enhancing the compatibility with those terminals that do not support the method in the present invention of using the user input indication message to include the text message when sending messages. This method offers a very strong real time property, easy operation and free message sending, thus it will certainly receive a warm welcome from users.

What is claimed is:

1. A transmission method in communication of a video phone call, including:
utilizing a user input indication message to include a text message during the transmission of the video phone call and displaying text contents of the text message on a calling interface of a terminal;

realizing transmission of the user input indication message that included the text message during communication of the video phone call;

wherein, the step of utilizing the user input indication message to include the text message includes:

adding a message header to the text message; and sending the text message to other party of the video phone call through the user input indication message;

wherein the message header is used for marking the text message containing text contents that is included in the user input indication message;

performing handshake negotiation with the terminal of the other party of the video phone call;

if the negotiation result is that the terminal of the other party of the video phone call does not support parsing the message header, then the user terminal will send the text contents of the text message via a short message to the terminal of other party of the video phone call so that the other party of the video phone call can access his/her terminal's short message module to read the text contents.

2. The transmission method according to claim 1, before the step of utilizing the user input indication message to include the text message, further including:

editing the text contents of the text message on the calling interface of the user terminal.

3. The transmission method according to claim 2, wherein in the step of displaying the text contents of the text message on the calling interface of the terminal, the other party of the call receives the user input indication message including the text message, and displays the text contents of the text message on the calling interface of his/her own terminal.

4. The transmission method according to claim 3, wherein the calling interface is equipped with an operating interface, when the text message is being edited or received, the text message is displayed on the operating interface.

5. The transmission method according to claim 4, wherein the operating interface includes a display area and provides operating commands for the user or the other party of the call to operate, and the text message is displayed in the display area;

the operating commands for the text contents include: editing a message, deleting a message, sending a message, saving a message or replying a message.

6. The transmission method according to claim 3, wherein the text message comprises text contents and the message header, and the message header is used for marking the text message containing the text contents that is included in the user input indication message;

after the step that the other party of the call receives the user input indication message including the text message, the transmission method also includes:

the terminal of the other party of the call parses the message header to determine that the text message containing the text contents is included in the user input indication message, and extracts the text contents of the text message received to display them on its own calling interface.

7. The transmission method according to claim 6, wherein in the step of displaying the text contents of the text message on the calling interface of the terminal, upon completion of extracting the text contents, the terminal's operating interface for the text contents of the text message is accesses;

the text contents of the text message are displayed on the operating interface of the calling interface, and the text contents are operated on the operating interface.

8. The transmission method according to claim 2, wherein in the step of editing text contents of the text message:

in a video phone call state, when it is necessary to edit text contents and send them to the other party of the call, the user enters a state of editing the text contents; and, on the calling interface, the user enters an message editing box to input and edit the text contents.

9. The transmission method according to claim 8, wherein before the step of sending the text message through the user input indication message, the text message is saved into the memory of the user terminal to make it easy to send for multiple times.

10. The transmission method according to claim 8, wherein when the text contents of the text message exceed a set value, the text message is sent to the other party of the call in batches.

11. The transmission method according to claim 8, wherein the text message comprises text contents and the message header, and the message header is used for marking the text message containing the text contents that is included in the user input indication message;

before the step of sending the text message through the user input indication message, the transmission method also includes:

the user terminal first performs handshake negotiation with the terminal of the other party of the call, if the negotiation result is that the terminal of the other party of the call can parse the message header, then the user terminal executes the sending step.

12. The transmission method according to claim 11, further including:

judging based on the message header whether the user input indication message is including a command message or a text message, if the user input indication message contains the message header, then the user input indication message includes a text message, and the text contents after the message header in the text message can be acquired.

13. The transmission method according to claim 1, wherein the text message comprises text contents and a message header, and the message header is used for marking the text message containing the text contents that is included in the user input indication message.

* * * * *